Oct. 9, 1928.
J. O. McMILLAN
1,686,569
COMPRESSOR
Filed Nov. 19, 1925     2 Sheets-Sheet 1
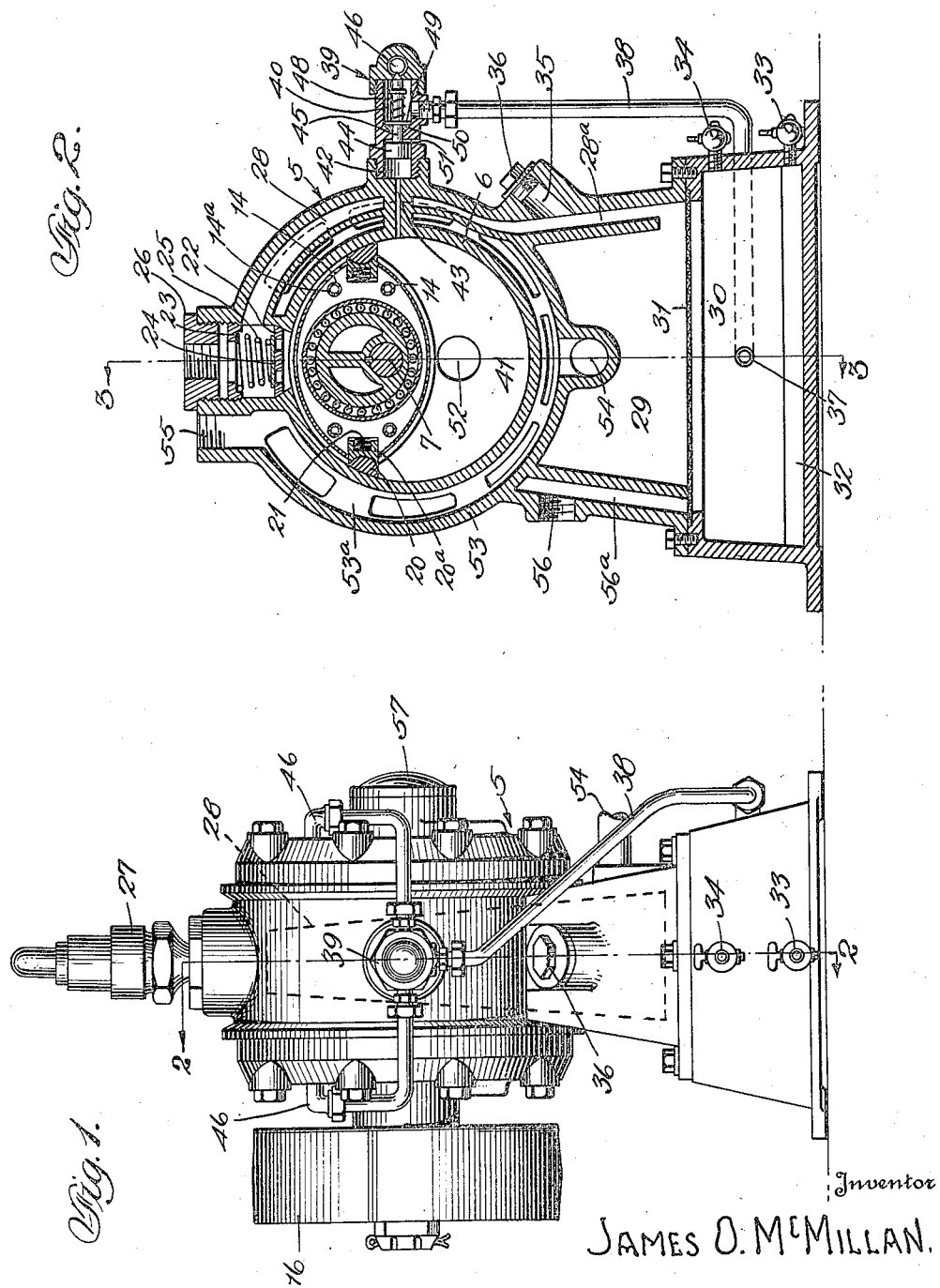
Inventor
JAMES O. McMILLAN.
By R.W. Strackman
Attorney

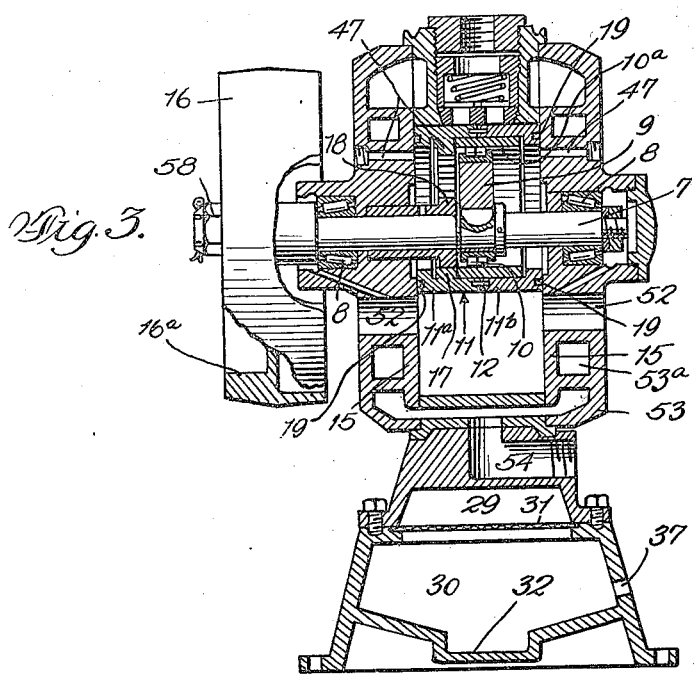

Patented Oct. 9, 1928.

1,686,569

UNITED STATES PATENT OFFICE.

JAMES O. McMILLAN, OF ELDORADO, KANSAS, ASSIGNOR TO STANDARD PUMP & SUPPLY COMPANY, OF WICHITA, KANSAS, A CORPORATION OF TEXAS.

COMPRESSOR.

Application filed November 19, 1925. Serial No. 70,097.

This invention relates to improvements in compressors or pumps, and while the structure will be described particularly with reference to its employment as an air compressor, it must be understood that it may be employed for pumping or compressing other gaseous fluids.

One of the objects of the invention is to provide a machine capable of high speed with isothermal efficiency. Another object is to furnish a machine having large intake ports, relatively large volume or capacity and capable of producing a high vacuum. The purpose of the latter being to cause the air or other gas to rush in under its own inertia, thus causing a quicker and better filling of the cylinder. A further object is to provide a machine in which the wear of the moving parts is automatically taken up, and which parts will be inexpensive to replace when finally worn out. Another object of the invention is to furnish a machine having parts which may be thoroughly lubricated, the lubricant functioning as a sealing means. Another object is to provide a machine which will deliver clean air or other gas, as all lubricant, water and other foreign matter is separated from the air or gas as it passes through the separator of the machine. A still further purpose of the invention is to furnish a machine that will be free from the irregularity of action and shock experienced with the ordinary reciprocating compressor or pump, thereby lengthening the life of the machine and permitting the use of less power for operation.

Another object is to provide a machine of his character which may be built inexpensively as it is of simple construction, and furthermore the machine is silent in operation.

With the foregoing objects outlined and with other objects in view which will appear as the description proceeds, the invention consists in the novel features hereinafter described in detail, illustrated in the accompanying drawings and more particularly pointed out in the appended claims.

Referring to the drawings:

Figure 1 is an elevation of the machine constructed in accordance with the present invention.

Fig. 2 is a vertical sectional view taken on line 2—2 of Figure 1.

Fig. 3 is a similar view taken on line 3—3 of Fig. 2.

Figs. 4, 5, 6 and 7 are diagrammatic views illustrating the piston in various positions during the operation of the compressor.

In the drawings, 5 designates a casing provided with a chamber 6, cylindrical in shape, in which is eccentrically mounted a shaft 7 journaled in tapered roller bearings 8. Splined on the shaft and arranged within the cylindrical chamber, is an eccentric 9 on which roll rollers 10, the eccentric functioning as an inner race ring, and the rollers being confined by an outer race ring $10^a$. Tightly fitting on the outer ring $10^a$ is a piston 11 which revolves with the outer ring and is made up of two halves or sections $11^a$ and $11^b$. Opposite faces of said halves are grooved to provide seats for a spring ring 12. The piston is preferably of substantially elliptical shape and the ring $10^a$ within the same helps hold the two halves of the piston in alignment and also packs off the piston from the compression chamber, hereinafter referred to. Each half of the piston, as best shown in Fig. 2, is provided with holes 14 containing coil springs $14^a$ which function to push the two halves of the piston away from each other and out against the end plates 15 of the cylinder, this arrangement being employed for packing efficiency and also serving to take up the wear of certain of the moving parts of the machine. Located in the section $11^a$ of the piston and fixed relatively thereto, is an internal gear 17. In mesh with the internal gear 17 is a stationary pinion 18 having half the number of teeth as is contained in the internal gear 17. Arranged on opposite sides of the piston are oil grooves 19, and at each end of the piston is a packing member 20. Each packing member may be made in two pieces arranged end to end so as to take up wear and each piece is preferably of substantially semi-cylindrical shape, the more sharply curved surface of the same fitting in the concavity of a seat $20^a$, which is pressed outwardly by spring means 21. From Figs 4 to 7 inclusive, it may be seen that the spring means causes the members 20 to snugly engage the cylindrical surface of the cylindrical chamber regardless of the position of the piston.

Referring now more particularly to Fig. 2, it may be seen that in the upper part thereof is an exhaust valve seat 22 held in place by valve clamp and bumper 23. The flap 24 of the valve is held down by a spring 25 which in turn is held by the bumper 23. The bushing 26 arranged at the upper end of the exhaust valve opening is for the purpose of holding the safety valve 27, shown in Fig. 1 but omitted from Figs. 2 and 3. The air or other gas compressed in or pumped by the machine, is forced outwardly past the flap 24 and enters a conduit 28 which extends down one side of the cylindrical wall of the compression chamber and exits into a passageway 28ª which in turn discharges air and lubricating oil into the oil separator 29 and oil receptacle 30. 31 indicates a screen of mesh wire of heavy gage extending across the hollow base of the machine and assisting in separating the air from oil or other extraneous matter. At the extreme lower end of the chamber 30, a trough or sump 32 is provided to receive any water or any other foreign matter which may reach the chamber 30 and settle out of the oil. A drain cock 33 is preferably arranged at the lower portion of the base to drain out the water or other foreign matter from the sump 32. A pet cock 34 is also arranged at the upper portion of the oil receptacle and functions as an indicator to notify the operator when the oil chamber is full, during the process of filling the same. A port 35 is provided for the purpose of pouring oil into the receptacle 30, and a plug 36 functions to close the port so that air will not escape at this point. A hole 37 in one wall of the chamber 30 serves as an outlet for the oil and passes the oil used as a lubricant, into the conduit 38 which leads to an automatic suction operated oil valve 39. The oil passing up the tube 38 enters the space 40, and when a sufficient suction or vacuum is created by the piston 11 within the crescent-shaped space 41 of the compression chamber, a vacuum is also created in the space 42 of the valve due to the opening 43. This suction causes the plunger or piston 44 to move toward the compression chamber, and as this plunger is rigid with the valve stem 45, it pulls upon the latter, thus opening the valve and permitting the oil, under pressure exerted in the chambers 29 and 30, to flow into pipes 46, both of which are clearly shown in Figure 1. These pipes extend from the valve 39 to ports 47 which are located in the end plates of the cylinder and open into the internal space of the piston. In this space, the oil is distributed by the centrifugal force generated by the piston. When the machine ceases operation, the vacuum force also ceases and the spring 48 of the valve 39 closes the latter. This spring also holds a washer 49 against the packing 50. An air vent 51 assists in the efficient operation of the oil valve.

The machine has two large air intake ports 52 located in the end plates 15. The machine, that is the cylinder of the machine, is surrounded by a jacket 53 to provide a space 53ª to receive water or any other suitable cooling agent. If water is used, it enters the machine through a pipe 54 and leaves through a pipe or outlet 55. The air or other gas pumped or compressed by the machine, leaves through outlet 56, shown in Fig. 2. It will be noted from this figure that the air must first pass through the screen 31 into the chamber 30 and then again through the screen into the passageway 56ª before it can discharge through the outlet 56. It is advisable to use a check valve in the outlet pipe 56 or else a stop valve, to cut off the air from the receiver (not shown) to the compressor when filling the chamber 30 with oil.

On the end of the machine opposite the flywheel pulley 16 is a blind cap 57 which covers and protects the roller bearing at this end. When the bearings become worn, adjustment may be made by tightening the nut 58 which abuts against the fly-wheel 16.

It must be understood that when the machine is in operation, the oil or other liquid lubricant within the receptacle or chamber 30 is under the same pressure as the air or other gas within the compression chamber and separator 29. Hence, provision is made whereby this pressure is automatically cut off from the compression chamber as soon as the operation of the machine ceases, otherwise the oil within the receptacle would continue to flow into the cylinder of the machine and flood the structure. The automatic oil valve 39 serves to prevent this.

From the diagrams shown in Figs. 4 to 7 inclusive, it may be seen that if the piston is driven in a clockwise direction, air will first be drawn in through the ports 52, as shown in Figure 4. As the piston revolves, these ports will be closed and consequently the air taken in at one side of the piston will now be compressed and the first portion of the compression operation is illustrated in Figure 5. As the piston moves further toward the position shown in Fig. 6, the space at one side of the piston will gradually diminish to zero and thus compress the air or other gas while the space at the other side of the piston will gradually enlarge and create a vacuum. Consequently when the piston reaches the position shown in Fig. 6, the vacuum created will cause air to rush into the vacuum compression chamber through the ports 52 and the air will continue to enter the vacuum space until the piston has reached its highest compression position, as shown in Fig. 7. Viewing now Figs. 2 and 5 together, it is obvious that when the vacuum is being created within the compression chamber, strong suction will be exerted through port 43 to open the automatic oil valve 39. Obviously when the piston reaches the position shown in Fig. 7, the vacuum force will be less and consequently the spring 48 will gradually close the automatic oil valve.

The operation is as follows: A motor may be coupled direct to the shaft 7 but I prefer to drive the machine from a belt placed on the fly-wheel pulley 16 and driven by any suitable source of power. As the shaft 7 revolves, the eccentric 9 will also rotate, taking with it the piston 11 and holding it in position. As the internal gear 17 revolves with the piston, it meshes with the stationary gear 18 and this causes the piston to turn relatively to the eccentric 9. The purpose of these gears is to reduce the speed of the piston down to one-half that of the shaft, so that when the eccentric is pointing down as in Figure 5, it will be positioned in the center of the cylinder at the same time that the piston is also centered in the cylinder, thus preventing any locking or jamming of the structure.

As the piston revolves, a high vacuum is formed at one side of the piston while compression is taking place at the opposite side. When the piston has displaced approximately two-thirds of the crescent-shaped volume or space on the compression side and has formed a vacuum of about two-thirds of the space on the opposite or suction side, the intake ports 52 will have just begun to open and the piston will only need to revolve about one-fifth of a revolution further until the two intake ports are entirely open. As before stated, the vacuum thus created will be so high that when the ports are opened the air will rush in with great force and fill the cylinder above atmospheric pressure. Both sides of the piston will be exposed to the same conditions and fresh air may circulate through the center of the piston, as no packing glands are necessary.

As the air is caught on one side of the piston, as mentioned above, it is forced out at the top past the disk 24 of the exhaust valve and thence into the air passageways 28 and 28ª, and as the air may carry some water or other extraneous matter, such as lubricating oil, it is forced to enter the oil separator 29. By the action of contact with the walls of the cylinder cooled with water, the air is cooled before it enters the separator 29, and as the passageway 28 widens from top to bottom, as shown in dotted lines in Fig. 1, it is obvious that more surface will be provided to cause the oil to cling thereto and separate from the air.

From the separator 29, the air and oil passes through the heavy mesh screen wire 31 and the oil drops into the receptacle or chamber 30. This construction of separator and oil chamber in the base of the machine is the simplest known by me where conservation of space is necessary in figuring the design.

The air, cooled and cleaned, leaves through outlet 56.

The fly wheel pulley 16 is provided with a weight mass 16ª to counterbalance the eccentric, thus placing the machine in perfect balance. In larger machines, two fly wheels should be employed, one at each end of the shaft.

While I have disclosed an advantageous form of the invention for the purpose of illustration and description, I am aware that various changes may be made in the details disclosed without departing from the spirit of the invention as expressed in the claims.

What I claim and desire to secure by Letters Patent is:

1. In a machine of the character described, a compression chamber, a piston arranged in said chamber and formed of a plurality of sections, each of substantially elliptical shape, means for rotating said piston, and means for forcing the sections apart to cause the sides of the piston to bear against the ends of the cylinder.

2. In a machine of the character described, a compression cylinder, a piston arranged in said cylinder and formed of a plurality of substantially similar sections, each section being of substantially elliptical shape lengthwise, means for rotating the piston, and means for forcing the sections of the piston away from each other and towards the ends of the cylinder.

3. In a machine of the character described, a cylinder, a shaft eccentrically mounted in the cylinder, a substantially elliptical-shaped piston operatively mounted on the shaft and consisting of a plurality of substantially elliptical-shaped sections, and spring means between the sections for forcing the latter against the ends of the cylinder.

4. In a machine of the character described, a cylinder having intake and outlet ports, a piston movably mounted in the cylinder and adapted to draw a fluid through the intake ports under vacuum force and to force the fluid through said outlet port, means actuated by the vacuum force created in the cylinder for furnishing lubricant to the working parts of the machine, and automatic means for controlling the last mentioned means in such manner that the lubricant will at all times be cut off from the cylinder when the piston ceases to operate.

5. In a machine of the character described, a cylinder having intake and outlet ports, a piston movably mounted in the cylinder and adapted in its operation to first create a vacuum in the cylinder, then permit air to be drawn by the vacuum force through the intake port into the cylinder, and to then compress said air and force the same through the exhaust port, an oil reservoir operatively connected to the cylinder and under the same pressure as exists in the cylinder during the operation of the piston, an oil controlling valve, a conduit for feeding oil from the reservoir through the valve to said cylinder, a port connecting the cylinder to the valve in such manner that the vacuum force created in the cylinder is exerted on the valve to open the latter and permit oil to flow through said conduit from the reservoir to the cylinder, and means for automatically closing the said valve when the piston ceases to operate.

6. In combination, a compression cylinder, a piston rotatably mounted in said cylinder, intake and exhaust ports for the cylinder, a base for the cylinder of hollow formation providing an oil chamber, a conduit for feeding oil from the chamber to the cylinder, said chamber being under a pressure equal to that existing in the cylinder on the compression stroke of the piston, an automatic oil valve arranged in the conduit and adapted to be actuated by suction force in the cylinder to permit oil to pass through the conduit, and means for automatically closing the valve when the piston ceases to operate.

7. A combination as claimed in claim 6 in which a passageway places the exhaust port of the cylinder in communication with said chamber, and a lubricant strainer arranged between said passageway and said chamber.

8. In a machine of the character described, a compression cylinder, a piston rotatably mounted in said cylinder and movable in a circle concentric with the axis of the cylinder, said piston being of substantially elliptical shape lengthwise, and having parallel sides engaging the ends of the cylinder, means for rotating the piston about its own axis and about the axis of the cylinder, and means including a valve controlled by the pressure in the cylinder for furnishing lubricant to the cylinder to oil seal the piston, said valve functioning to cut off the feed of lubricant to the cylinder at all times when the piston ceases to operate.

9. In a machine of the character described, a cylinder, a base for the cylinder, an oil chamber in the base, an air outlet communicating with said chamber, an outlet for the cylinder, a passageway placing the last mentioned outlet in communication with the oil chamber, a conduit for feeding oil from the chamber to the cylinder, a piston arranged in said cylinder and movable in a circle concentric with the axis of the cylinder, said piston being of substantially elliptical shape lengthwise and having parallel sides engaging the ends of the cylinder, a valve in said conduit controlled by pressure in the conduit and adapted to automatically cut off the feed of lubricant to the cylinder when the piston ceases to operate, and means for rotating the piston about it own axis and about the axis of the cylinder.

10. In a machine of the character described, a compression cylinder having parallel ends, intake ports for the cylinder, arranged in the ends of the latter, an outlet for the cylinder, arranged in the periphery of the same, a piston rotatably mounted in said cylinder and movable in a circle concentric with the axis of the cylinder, said piston being of substantially elliptical shape lengthwise, and having parallel sides engaging the ends of the cylinder, and means for rotating the piston about its own axis and about the axis of the cylinder.

In testimony whereof he affixes his signature.

JAMES O. McMILLAN.